Oct. 26, 1937.  A. G. PLIMMER  2,097,340
ANTIFRICTION SUPPORT FOR MACHINE TOOL SLIDES
Filed May 6, 1935
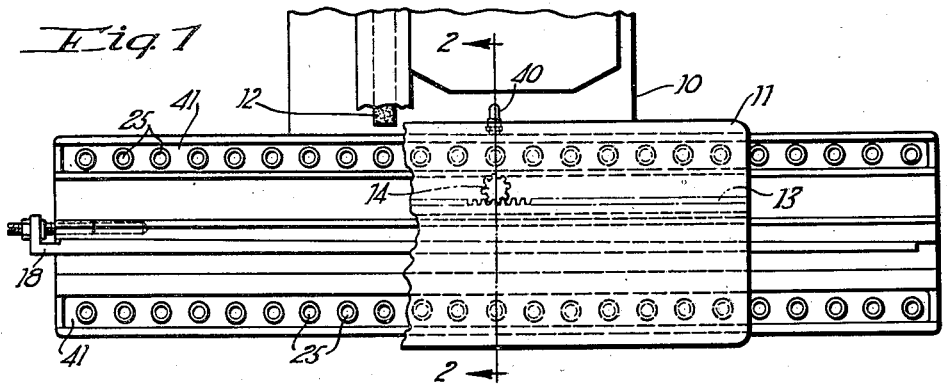
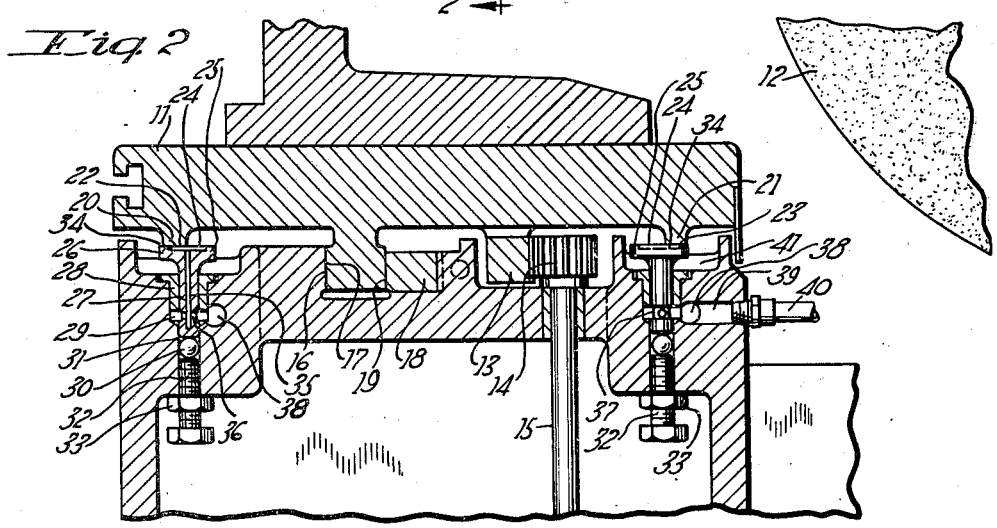
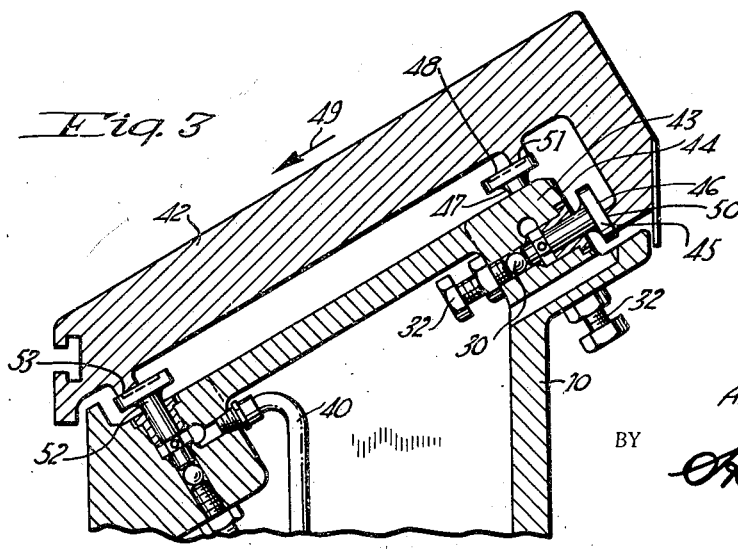
INVENTOR.
ALFRED G. PLIMMER
BY
A. H. K. Parsons
ATTORNEY.

UNITED STATES PATENT OFFICE 2,097,340

ANTIFRICTION SUPPORT FOR MACHINE TOOL SLIDES

Alfred G. Plimmer, Cincinnati, Ohio, assignor to Cincinnati Grinders Incorporated, Cincinnati, Ohio, a corporation of Ohio Application May 6, 1935, Serial No. 19,917

10 Claims. (Cl. 308—6)

This invention relates to machine tools and more particularly to improved means for supporting a movable slide thereon.

One of the objects of this invention is to improve the supporting means for machine tool slides in such a manner as to lessen the starting torque required to initiate movement.

Another object of this invention is to provide an improved supporting means for the purpose described, which is anti-frictional in nature but which has sufficient friction to prevent free movement of the slide.

A further object of this invention is to provide an improved supporting means comprising a multiplicity of antifriction members which will be inexpensive to manufacture and in which the members may be easily and accurately aligned, not only at initial assembly but for subsequent wear.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a plan view illustrating the principles of this invention as applied for supporting the movable slide of a machine tool, such as a grinding machine.

Figure 2 is a sectional view taken on the line 2—2 of Figure 1.

Figure 3 is a sectional view showing the principles of this invention applied for supporting a slide which has bearing surfaces lying in other than a horizontal plane.

It is well known that the power required to initiate a movement of a machine slide depends upon the amount of "limiting friction" to be overcome, and the value of this friction depends upon the type of bearing or supporting means for the slide and the weight of the slide to be moved. In other words, the total value depends upon the coefficient friction between the contacting surfaces and the weight of the slide. It is, therefore, evident that in order to reduce the power necessary to move the slide that the coefficient of friction must be reduced because it is impossible to reduce the weight of a slide.

It is also well known that the power required to initiate movement of a slide is always greater than the power required to maintain the ensuing motion and this additional friction to be overcome in order to start movement has often been referred to as static friction and the peak value of it just prior to motion taking place is termed "limiting friction". It is also believed to be evident that the value of the limiting friction is proportional, but always greater, than the value of the friction during movement. Therefore, if the friction during movement can be reduced, then the limiting friction is likewise and automatically reduced.

In prior attempts to reduce friction between movable slides and their supports, and which has usually been in the form of sliding friction, resort has been had to rolling friction which structurally has taken the form of frictionless rollers. The use of frictionless rollers does eliminate the friction, but usually to too great an extent, whereby the slide in question moves too easily and there is not sufficient static friction present to hold it in a given position against ordinary forces incident to loading and unloading a slide with work.

In addition, the use of such frictionless rollers introduced a very difficult problem of initial alignment and subsequent provision for take-up in case of wear. In precision tools, such as in grinding machines, in which work is performed to a precision of a tenth of a thousandth of an inch or less it is absolutely necessary that the slide shall not deviate from its plane of movement, and this requires absolute parallel surfaces between which the frictionless rollers are to be mounted, and this necessitates that each roller must be a true circle, must rotate about its true center, and each roller must be absolutely the same in diameter with a precision altogether too difficult to obtain with present equipment.

This invention is designed and intended to overcome the aforesaid difficulties and disadvantages and to provide a supporting means which is anti-frictional in nature, that is, tends toward the reduction of friction as distinguished from the optimum condition of frictionless. In other words, a bearing or supporting means for longitudinally movable slides has been provided which involves a combination of sliding and rolling friction having a value which is considerably less than pure sliding friction and slightly greater than pure rolling friction whereby the value of the limiting friction is greatly reduced with a consequent reduction in starting torque, but still there is sufficient friction present to maintain the slide against movement during loading thereof.

In addition the structure is such that no expensive sizing or precision manufacturing problems are introduced, and although a plurality of anti-friction members are utilized they are easy to assemble, align, and subsequently adjust for wear, the latter being impossible with frictionless rollers.

In the drawing the reference numeral 10 indicates the bed of a machine, which may be in the form of a precision grinding machine for illustrative purposes, and upon the bed is a longitudinally movable slide 11 which may be utilized for supporting work in operative relation to a grinding wheel 12, and this may be accomplished through the aid of suitable headstocks and tailstocks in the conventional manner of operating such machines.

The table may be propelled by means of a rack 13 fixed to the underside of the slide 11 and intermeshing with pinion 14 rotatably supported upon a shaft 15. This shaft may be rotated either by power or by hand through suitable old and well known means utilized in this art for such purposes.

To maintain alignment and prevent lateral movement in a horizontal plane the bed may be provided with a guiding surface 16 which contacts a flat guiding surface 17 carried by the slide or table. An adjustable gib 18 may be interposed between the other surface 19 carried by the slide 11 and the bed. It will be noted that the surface 16 is formed on the solid part of the bed and in opposition to the direction of thrust created by the grinding wheel.

Since the thrust created by the grinding wheel is however relatively small no means are usually provided to prevent or guard against lifting of the table 11. If this invention were applied to a machine in which such provision was necessary it could be applied without affecting the principles of this invention.

The means for anti-frictionally supporting the slide on the bed comprises, as shown in Figure 2, a pair of parallel ribs 20 and 21, which depend from the underside of the slide and extend longitudinally thereof in the direction of movement, and these ribs have surfaces 22 and 23 formed thereon which lie in the same plane. These surfaces contact the faces 24 of a plurality of anti-friction members 25, each of which consists of a rotatable disc 26 and an axially extending stem 27. The diameters of these stems are ground or otherwise finished in a perpendicular relation to the faces 24 of the disc 26. The stems are rotatable in bushings 28 which are inserted in holes 29 formed in the bed. The end of each stem contacts a ball 30 which forms an almost frictionless support for the anti-friction member, and the ball is confined in a bore 31 which is formed in the bed co-axially with the bore in the bushing 28. An adjusting screw 32, having a lock nut 33 threaded thereon, is threaded into the end of the bore 31 for supporting the ball 30 and thereby the anti-friction member and is also utilized for raising or lowering these supported parts whereby the faces 24 of the disc may be adjusted and aligned in the same plane.

From this it will be seen that each anti-friction member and its supporting means may be independently manufactured without regard to the others, and thus may be subsequently assembled and each one individually adjusted until their faces all lie in the same plane. Since each one is individually adjustable it is a simple matter to make subsequent adjustments for wear.

It will be noted from Figure 2 that the surfaces 22 and 23 are so positioned and of such width that they engage less than one-half of the area of the face of the disc and that contact is all on one side of a diameter passing through the face of the disc which is parallel to the direction of movement of the support. In other words, the surface 22 crosses the face of the disc in a direction similar to a secant and therefore the surface 22 may be said to secantially contact the faces of the supporting discs aligned therewith. It will be noted in Figure 2 that the ribs cross the respective rows of discs in such a manner that the discs in each row will rotate in the same direction. This is not necessary, however, as either rib can be positioned to one side or the other of an imaginary line passing through a center of a given row of discs without regard to the position of the other rib with respect to its contact discs.

Due to the secantial arrangement previously mentioned it will be apparent that the portion of the disc in contact with the face of the rib will travel in the same general direction, even although the contact portion of the disc face is traveling in an arcuate path. It will also be noted that the line of contact between the face of the disc and the face of the rib and which corresponds to a radial line lying in the face of the disc, which is perpendicular to the direction of slide movement, is similar to the line contact between the periphery of a frictionless roller and a flat surface in that the contacting points along said line move together and in the same direction, which may be said to correspond to rolling friction. At all other points of contact between the face of the disc and the face of the rib there is a converging and diverging relative motion which corresponds to sliding friction but which has a lateral component as respects the direction of movement of the slide, thereby lessening the component in the direction of movement and a consequent lessening of the power required to initiate and sustain movement.

The anti-friction members may be constructed in a manner to facilitate lubrication of the abutting surfaces and to this end the face of each disc may have a depression 34 formed therein and connected by an axial bore 35 to a cross bore 36 formed in the lower end of the stem. This cross bore may be at such a point as to communicate with an annular groove 37 which may be automatically formed in the bore 29 by making the bushing 28 axially shorter than the depth of bore 29.

These annular grooves may be interconnected by a longitudinal bore or channel 38 and at a suitable point, such as at 39; this channel may be interconnected with a lubricant supply pipe 40. The pressure of the lubricant delivered to channel 40 may be just sufficiently above atmospheric pressure to cause overflow of the lubricant in the depression 34 on the upper face of the disc and thereby be carried intermediate the contacting areas of the surface 20 and the face 22 of the disc.

The upper part of the bed may also be formed with a depression 41 which surrounds all of the anti-friction members for collecting the overflowing lubricant and suitably returning the same to reservoir. In this manner the parts may be very simply and positively lubricated.

By reference particularly to Figures 2 and 3, the relationship of the rib members 20, 21—or alternatively the corresponding rib members 51, 53 as well as rib 50 with respect to the surface of the discs, will be particularly apparent. It will be noted that the formation of the lubricant recess, such as 34, provides an upstanding circumferential rib portion on the discs which has engagement through an arc of less than 180 degrees with the ribs on the table. The outer portion of this arcuate rib—by rotation on its axis—moves continuously in a substantially tangential direction or with the traverse of the table member for anti-frictionally supporting and facilitating movement of the table member. At the same time, the horns of the arc will be moving successively in a forwardly and outwardly and forwardly and inwardly direction with respect to the contacting portion of the rib, thus having a certain friction steadying the table movement, as hereinabove particularly described.

In Figure 3 there is shown a different form of machine tool bed in which the table 42 is so formed and mounted that it is held in proper alignment by its own weight, or in other words, by gravity. In this case, the bed is formed with a V 43 in one face 44 of which is mounted a series of anti-friction members 45 having faces 46 lying in a plane at an angle of 60° to the horizontal and a second series of anti-friction members 47 having their faces 48 lying in a plane at right angles to the faces 46. Since the weight of the slide 42 tends to cause movement of it in the direction of arrow 49, the face 50 will abut the faces of members 45 and thereby position the slide laterally and the face 51 will support the slide.

Additional support may be provided by means of a third series of rollers 52 contacting the face 53 of the slide. It will be noted that the general direction of the line of contact between each face on the slide and the respective discs is secantial and that the construction of the various anti-friction members and their mountings are exactly the same regardless of the angle of their axes.

There has thus been provided an improved anti-friction supporting means for machine tool slides which generally improves the operating characteristics thereof.

What is claimed is:

1. In means for supporting a slide for movement on a support, the combination of rectilinear guiding means for determining the direction of slide movement, antifriction supporting means including a plurality of rotatable antifriction members, each having a circular face perpendicular to its axis of rotation, said members being carried by one member, and a rectilinear surface formed on the other member and positioned for simultaneously contacting the faces of all of said antifriction members but in the relationship of a secant.

2. In means for supporting a slide on a support, the combination of a plurality of rows of antifriction members rotatably mounted in one of said parts and having contact faces perpendicular to their axes of rotation, relatively narrow longitudinally extending surfaces formed on the other part, each surface engaging the contact faces of the members in one row, said surfaces being so spaced as to cross the contact faces of said members in a secant relation.

3. In a machine tool having a bed and a slide reciprocably mounted upon the bed, the combination of means for anti-frictionally supporting the slide comprising a plurality of rows of rotatable discs mounted in the bed, contact surfaces formed on the slide and engaging the respective rows of discs, each disc having an axial extending stem, and antifriction means mounted in the bed engaging the end of said stem for rotatably supporting and positioning said disc in contact with said surface.

4. In means for supporting a table on a bed, the combination of a plurality of rotatable discs having contact faces which eccentrically engage a surface on the table, each disc having an axially extending stem, a ball engaging the end of said stem, adjustable means engaging said ball for receiving the thrust on said discs, said discs having a depression in the face thereof, and means to flood said depressions with lubricant.

5. In means for supporting a table on a machine tool bed, the combination of a plurality of discs rotatably mounted in said bed, a surface formed on the table and eccentrically contacting the face of said discs, said discs having a depression formed in the faces thereof, a supporting stem extending axially from the center of said discs, a bore formed axially in said stem and terminating in a cross bore, and means to deliver lubricant under pressure to said cross bore and thereby flood said depression and the contact surface surrounding same.

6. In a machine tool having a bed and a table reciprocably mounted thereon for moving work past a grinding wheel, the combination of a thrust surface formed on the bed and engaging a complementary surface formed on the table for absorbing the thrust of the grinding wheel, means for supporting the table without interfering with the thrust reactions including a plurality of discs having their faces lying in one plane, surfaces formed on the under side of the table and engaging the faces of said discs, said surfaces being so positioned and of such width that they engage less than one-half of the face of said discs whereby they will tend to impart rotation thereto during movement of the table.

7. In a machine tool having a bed and a table reciprocably mounted thereon for moving work past a grinding wheel, the combination of a thrust surface formed on the bed and engaging a complementary surface formed on the table for absorbing the thrust of the grinding wheel, means for supporting the table without interfering with the thrust reactions including a plurality of discs having their faces lying in one plane, surfaces formed on the underside of the table and engaging the faces of said discs, said surfaces being so positioned and of such width that they engage less than one-half of the face of said discs whereby they will tend to impart rotation thereto during movement of the table, means to lubricate the faces of said discs, and a pocket formed in the bed in surrounding relation to said discs for collecting the lubricant escaping from the faces thereof.

8. In a machine tool structure of the character described, the combination with a bed unit, of a table member translatable relative thereto, said table having guides formed thereon, the bed having sockets formed therein in offset relation to the guides, table supporting members rotatably mounted in the sockets and having enlarged laterally extending head portions terminally engaging the guides on the table, substantially as and for the purpose described, and means for supplying lubricant to the inter-engaged heads and ways by way of the sockets, said means including a coupled channel to permit entrance of oil to the sockets.

9. In a machine tool structure of the character described, the combination with a bed unit, of a table member translatable relative thereto, said table having guides formed thereon, the bed having sockets formed therein in offset relation to the guides, table supporting members rotatably mounted in the sockets and having enlarged laterally extending head portions terminally engaging the guides on the table, substantially as and for the purpose described, anti-friction devices in the sockets engaging the supporting members to facilitate the free rotation thereof, and means for simultaneously supplying lubricant by way of the sockets to said anti-friction devices and the inter-engaged surfaces of the members and ways, said means including a member providing a lubricant supplying channel, the anti-friction devices having lubricant transmitting passages communicating with said channel.

10. In a machine tool structure of the character described, the combination with a bed unit, of a table member translatable relative thereto, said table having guides formed thereon, the bed having sockets formed therein in offset relation to the guides, table supporting members rotatably mounted in the sockets and having enlarged laterally extending head portions terminally engaging the guides on the table, substantially as and for the purpose described, anti-friction devices in the sockets engaging the supporting members to facilitate the free rotation thereof, means for simultaneously supplying lubricant by way of the sockets to said anti-friction devices and the interengaged surfaces of the members and ways, and means for individually adjusting the position of the respective anti-friction devices and thus of the support members engaged thereby with respect to the bed.

ALFRED G. PLIMMER.